(12) United States Patent
Kojima et al.

(10) Patent No.: US 6,609,756 B2
(45) Date of Patent: Aug. 26, 2003

(54) SEAT RECLINING DEVICE FOR VEHICLE

(75) Inventors: Yasuhiro Kojima, Kariya (JP); Naoaki Hoshihara, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/964,409

(22) Filed: Sep. 28, 2001

(65) Prior Publication Data

US 2002/0041119 A1 Apr. 11, 2002

(30) Foreign Application Priority Data

Sep. 28, 2000 (JP) ........................................ 2000-297691

(51) Int. Cl.[7] .............................................. B60N 2/02
(52) U.S. Cl. .................................. 297/367; 297/354.12
(58) Field of Search ............................. 297/367, 354.12, 297/366

(56) References Cited

U.S. PATENT DOCUMENTS

| | | | | |
|---|---|---|---|---|
| 4,087,885 A | * | 5/1978 | Gillentine | 16/325 |
| 4,348,050 A | * | 9/1982 | Letournoux et al. | 297/365 |
| 5,161,856 A | * | 11/1992 | Nishino | 297/367 |
| 5,216,936 A | * | 6/1993 | Baloche | 74/527 |
| 5,590,931 A | * | 1/1997 | Fourrey et al. | 297/366 |
| 5,681,086 A | * | 10/1997 | Baloche | 297/367 |
| 5,762,400 A | * | 6/1998 | Okazaki et al. | 297/367 |
| 5,788,325 A | * | 8/1998 | Ganot | 297/216.14 |
| 5,984,413 A | * | 11/1999 | Baloche et al. | 297/367 |
| 6,007,152 A | * | 12/1999 | Kojima et al. | 297/367 |
| 6,007,153 A | * | 12/1999 | Benoit et al. | 297/378.12 |
| 6,164,723 A | * | 12/2000 | Ganot | 297/378.12 |
| 6,325,458 B1 | * | 12/2001 | Rohee et al. | 297/367 |
| 6,474,740 B1 | * | 11/2002 | Kondo et al. | 297/367 |

FOREIGN PATENT DOCUMENTS

JP          11-70028 A          3/1999

\* cited by examiner

*Primary Examiner*—Peter M. Cuomo
*Assistant Examiner*—Joseph Edell
(74) *Attorney, Agent, or Firm*—Burns, Doane, Swecker & Mathis, LLP

(57) ABSTRACT

A seat reclining device for a vehicle includes a lower arm, an upper arm rotatably supported by the lower arm, and a locking mechanism for preventing the upper arm from rotating against the lower arm. The locking mechanism has a plurality of pawls, each of which engages with one of the lower arm or the upper arm. A cam rotates to slide the pawls, and a guide portion is formed on the lower or upper arm for guiding the cam to match the rotation center of the cam with the center of the lower and upper arm upon disengagement of the external gears from the internal gear.

17 Claims, 4 Drawing Sheets

SEAT RECLINING DEVICE FOR VEHICLE

The present application is based on and claims priority under 35 U.S.C. §119 with respect to Japanese Patent Application No. 2000-297691 filed on Sep. 28, 2000, the entire content of which is incorporated herein by reference.

FIELD OF THE INVENTION

The present invention generally relates to a vehicle seat. More particularly, the present invention pertains to a seat reclining device for a vehicle seat that permits adjustment of the angle of inclination of the seat back relative to the seat cushion.

BACKGROUND OF THE INVENTION

An example of a known seat reclining device for a vehicle is disclosed in Japanese Unexamined Patent Publication No. H(Heisei) 11-70028. This published patent application describes a seat reclining device having a lower arm which is connected with the seat cushion, an upper arm which is rotatably supported by the lower arm and connected with the seat back, and a locking mechanism which has a plurality of pawls and a cam. The lower arm supports each of the pawls. Each of the pawls has an external gear which engages an internal gear formed on the upper arm. The cam forces the pawls to slide so as to engage or disengage the external gear with the internal gear. Plural spiral springs are also arranged between the cam and the upper arm. The spiral springs urge the cam to rotate so as to engage the upper arm with the lower arm.

In the known device described above, the axis of rotation of the cam can be moved within a predetermined range so that the pushing forces applied on each of the pawls by the cam toward the internal gear come to be equal, even if each of the parts has some dimensional dispersion or variation. This movement of the rotation axis of the cam compensates for dimensional variations in the parts and maintains a certain lock engagement between the upper arm and the lower arm. However, when the cam rotates to disengage the pawls from the upper arm, the rotation center of the cam is moved from its dimensional center because the plural spiral springs can not apply an even force due to their force dispersion. This does not cause significant difficulties during engagement, but can sometime cause an undesirable or uncomfortable noise problem during disengagement because all of the pawls are not simultaneously disengaged from the internal gear by the cam. That is, when the some of the pawls become disengaged from the internal gear, others still remain engaged and generate undesirable noise during the operation.

A need thus exists for a seat reclining device that is not as susceptible to the drawback mentioned above.

It would thus be desirable to provide a seat reclining device that does not generate noise to the same extent as in the known seat reclining device described above.

SUMMARY OF THE INVENTION

According to one aspect of the invention, a seat reclining device for a vehicle includes a lower arm, an upper arm rotatably supported by the lower arm, and a locking mechanism for preventing the upper arm from rotating against the lower arm. The locking mechanism has a plurality of pawls, each of which engages with one of the lower arm or the upper arm. A cam rotates to slide the pawls, and a guide portion is formed on the lower or upper arm for guiding the cam to match the rotation center of the cam with the center of the lower and upper arm upon disengagement of the external gears from the internal gear.

According to another aspect of the invention, a seat reclining device for a vehicle includes a lower arm, an upper arm rotatably supported by the lower arm, an internal gear formed on one of the lower arm and the upper arm, a locking mechanism having a plurality of pawls each provided with an external gear to engage with or be disengaged from the internal gear, a cam rotatable to slidably move the pawls and including a plurality of first projecting portions and a plurality of second projecting portions. The first projecting portions each engaging one of the pawls during rotation of the cam in a first direction to engage the external gear of the pawls with the internal gear. A shaft engages the cam to transmit a rotation force to the cam to rotate the cam in a second direction opposite the first direction to permit disengagement of the external gear of the pawls from the internal gear. A guide portion is formed on one of the lower or upper arms and is engaged by one of second projecting portions during rotation of the cam in the second direction so that a rotation center of the cam coincides with a center of the lower and upper arms.

According to another aspect of the invention, a seat reclining device for a vehicle includes a lower arm, an upper arm rotatably supported by the lower arm, an internal gear formed on one of the lower arm and the upper arm, a locking mechanism having a plurality of pawls each provided with an external gear to engage with or be disengaged from the internal gear, and a cam rotatable to slidably move the pawls during rotation of the cam in a first direction to engage the external gear of the pawls with the internal gear. A shaft engages the cam to transmit a rotation force to the cam to cause the cam to rotate in a second direction opposite the first direction to permit disengagement of the external gear of the pawls with the internal gear. A plurality of guide portions is formed on one of the lower or upper arms, with each guide portion including a pair of spaced apart projections between which is slidably arranged one of the pawls. At least one of the projections of each pair of projections has a guide surface portion engaged by the cam during rotation of the cam in the second direction.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
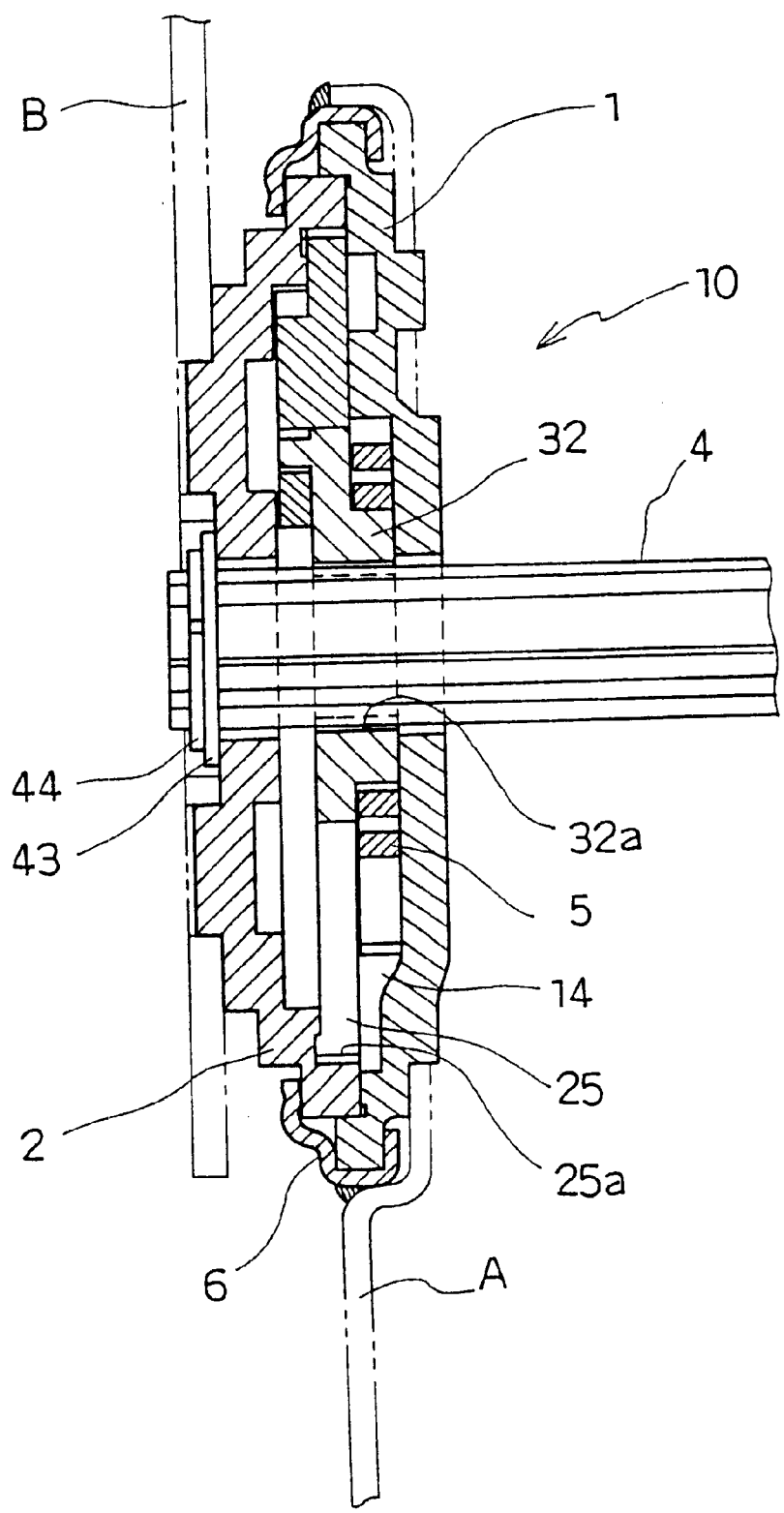
FIG. 1 is a vertical cross-sectional view of a seat reclining device in accordance with the present invention taken along the section line I—I of FIG. 2.
Figure 3:
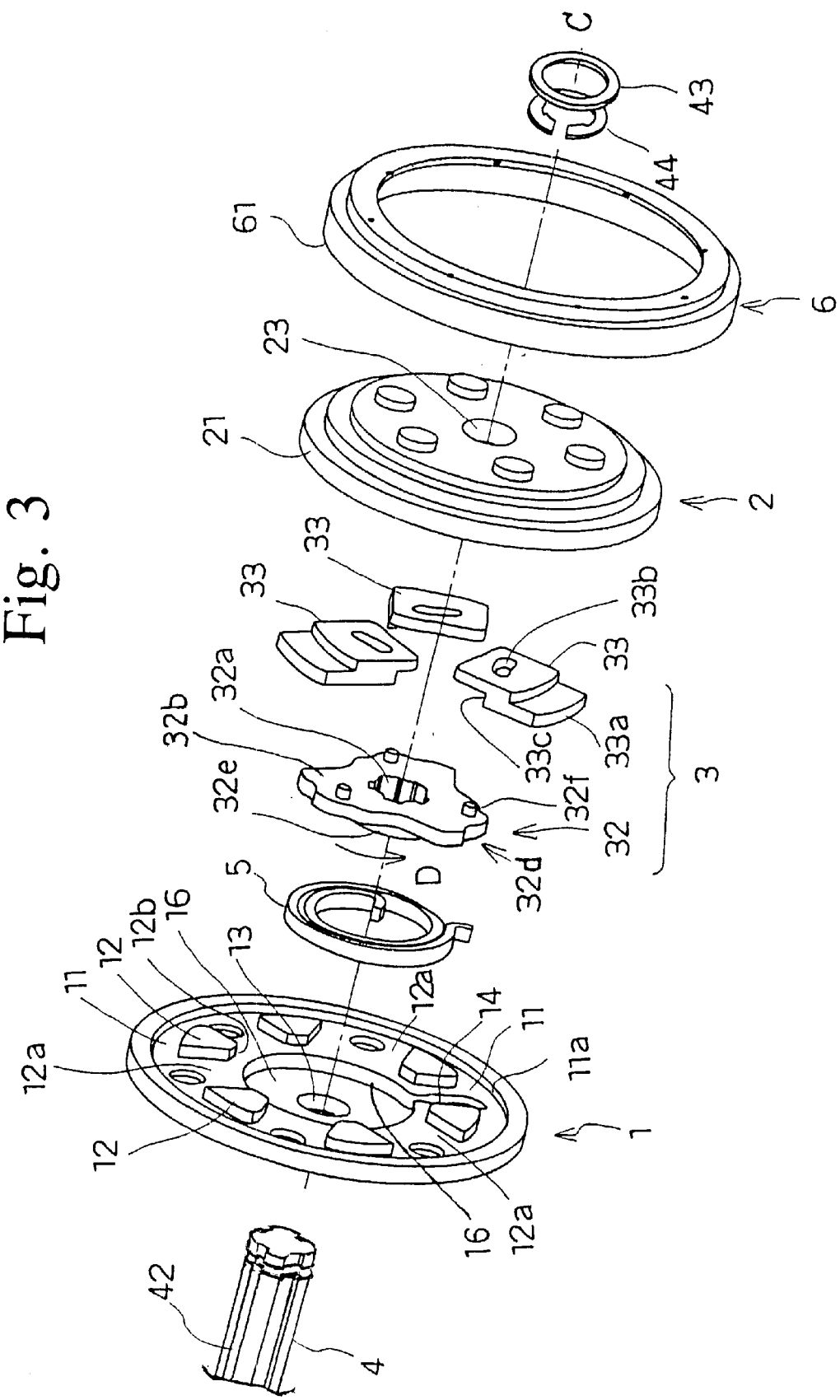
FIG. 3 is an exploded perspective view of the seat reclining device in accordance with the present invention.

As shown in FIGS. 1 and 3, the seat reclining device 10 of the present invention is adapted to permit the angle of inclination of the seat back of a vehicle seat to be adjusted relative to the seat cushion of the vehicle seat. The seat reclining device 10 includes a lower arm 1, an upper arm 2 and a locking mechanism 3. The vehicle seat has a pair of the seat reclining devices 10, with one of the devices being positioned on each side of the vehicle seat. The two seat reclining devices 10 are symmetrical to one another and so the structure and operation of the seat reclining device 10 on only one side of the vehicle seat will be described. It is to be understood that the structure and operation of the seat reclining device 10 on the other side of the vehicle seat is the same.

The lower arm 1 of the seat reclining device 10 is connected to a seat cushion frame A of the seat while the upper arm 2 of the seat reclining device 10 is connected to a seat back frame B of the seat. The lower arm 1 and the upper arm 2 are configured in the illustrated manner and possess an outward appearance of a concaved disk or a disk having a recessed portion. The outer diameter of the lower arm 1 is larger than that of the upper arm 2.

The lower arm 1 has a round concave or recessed central portion 11 bounded by an inner circumferential wall 11a as shown in FIG. 3. The lower arm 1 is made from a steel plate by a process of half-die-cutting to form the recessed portion 11 and the inner circumferential wall 11a. The half-die-cutting process is a press forming process in which a steel plate is pressed and partially sheared in the plate thickness direction for forming a concave or recessed portion on the plate while a partially continuous portion on the edge remains outside of the concave or recessed portion.

Figure 4:
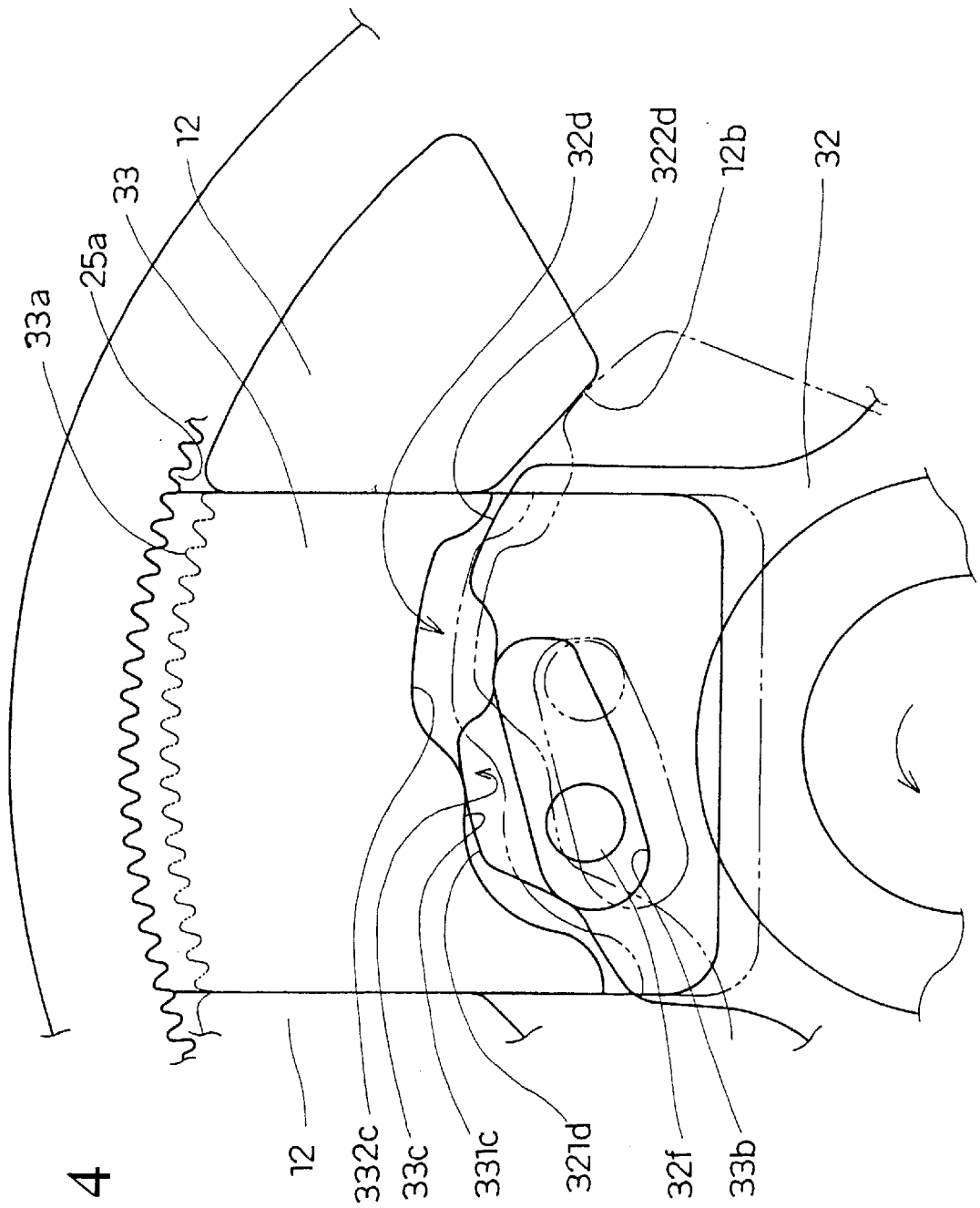
FIG. 4 is an enlarged front view of a portion of the seat reclining device of the present invention illustrating the pawl and the cam.

The bottom surface of the concave portion 11 is provided with three pairs of projections 12. Each pair of adjacent projections 12 forms a guide portion 12a which extends in the radial direction of the lower arm 1. The pairs of projections are circumferentially arranged at substantially equal angular intervals. As shown in FIG. 4, a guide surface portion 12b is formed on each of the projections 12. The guide surface portions 12b of the projections 12 are arranged along a circle or circular arc having a center on the axial line or axis C shown in FIG. 3 as explained in more detail below to form a guide portion. The guide portion is thus defined by the spaced apart guide surface portions 12b.

The upper arm 2 has a concave or recessed portion 25 as shown in FIG. 1. The upper arm is also formed by a half-die-cutting process. The upper arm 2 has an outer circumferential portion 21 which is adapted to engage with the inner circumferential wall 11a of the lower arm 1 in a manner allowing relative slidable rotation of the arms. With the upper arm 2 and the lower arm 1 positioned so that the outer circumferential portion 21 of the upper arm 2 engages the inner circumferential wall 11a of the lower arm 1, the recessed portions 11, 25 face each other to form a generally closed space between the lower arm 1 and the upper arm 2. The outer circumferential portion 21 and the inner circumferential wall 11a function as a slide bearing for the rotation of the lower arm 1 relative to the upper arm 2. The axis or axial line C shown in FIG. 3 is defined as the rotation axis of the lower arm 1 and the upper arm 2. An inner gear 25a which faces inwardly is formed on the inner circumferential wall of the concave portion 25. The center of the pitch circle of the internal gear 25a is located on the axial line or axis C.

After the lower arm 1 and the upper arm 2 are sub-assembled, a holder 6 is set on the lower arm 1 and the upper arm 2a. A flange portion 61 of the holder 6 is bent to support both of the arms 1, 2 as shown in FIG. 1. The holder 6 is finally welded to the seat cushion frame A as illustrated in FIG. 3.

Figure 2:
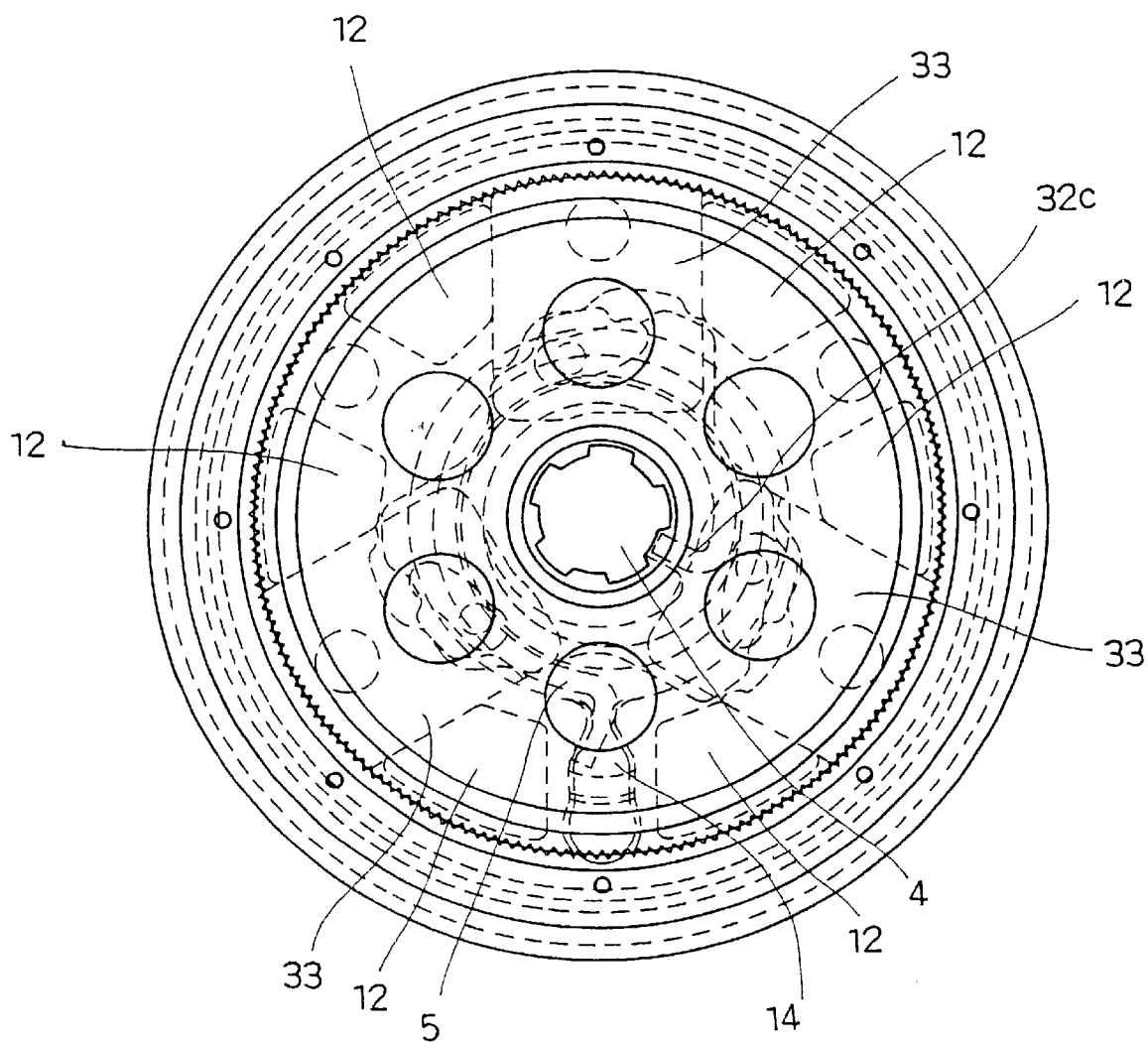
FIG. 2 is a side view of the seat reclining device in accordance with the present invention.

Referring to FIGS. 2 and 3, the locking mechanism 3 that is located within the recessed portion 25 includes three pawls 33 and a cam 32. Each of the pawls 33 is arranged in one of the guide portions 12a respectively so as to be slidable in the radial direction of the lower arm 1. The outer end of each pawl 33 is provided with an external gear 33a. The external gear 33a is adapted to engage with the internal gear 25a of the upper arm 2 when the pawl 33 slides outwardly in the radial direction from the axial line or axis C.

Each pawl 33 is also provided with a cam hole 33b and a pawl-cam surface 33c. The cam hole 33b is bored through the pawl 33. The pawl-cam surface 33c is located on one side face of the lower arm 1 and is positioned between the external gear 33a and the cam hole 33b.

The cam 32 is arranged between the pawls 33 and the lower arm 1 in the recessed portion 25. The cam 32 is rotatable about the axis or axial line C. The cam 32 is provided with a center bore 32a located at the rotational center of the cam 32. The cam 32 also has three protuberances 32b circumferentially spaced apart at equal angular intervals. Each of the protuberances 32b extends generally in the radial direction. A cam surface 32d is provided on the top portion or free end portion of each of the protuberances 32b. Each of the cam surfaces 32d is adapted to contact the pawl-cam surface 33c of one of the pawls 33. Each protuberance 32b also has a pin 32f facing towards one of the pawls 33 and positioned in the cam hole 33b of the respective pawl 33.

As shown in FIG. 3, a connecting shaft 4 is arranged on the axial line or axis C to control the seat reclining devices on the both sides of the seat. The outer surface of the connecting shaft 4 is provided with a plurality of grooves 42 forming a spline. The connecting shaft 4 is introduced into a center bore 23 of the upper arm 2, the center bore 32a of the cam 32, and a center bore 13 of the lower arm 1. The inner circumference of the center bore 32a in the cam 32 is provided with a plurality of grooves that are formed to loosely engage the grooves 42 of the connecting shaft 4 with predetermined clearances. The clearances between the grooves on both the connecting shaft 4 and the center bore 32a are formed to permit some amount of displacement of the cam 32 in the perpendicular direction of the connecting shaft 4 axis or the axial line C, while not permitting rotation between the connecting shaft 4 and the cam 32, when the connecting shaft 4 rotates. An operation handle is integrally attached to one end of the connecting shaft 4 so to be able to rotate the connecting shaft 4. At the other end of the connecting shaft 4, a washer 43 and a ring 44 are attached for holding the connecting shaft 4.

As shown in FIG. 3, a centrally located concave portion or recessed portion 16 is formed on the bottom of the recessed portion 11 of the lower arm 1. The depth of the recessed portion 16 is deeper than that of the concave portion 11. The concave portion 16 has an inner circumferential wall 16a which is substantially circular. The center of the inner circumferential wall 16a is on the axial line or axis C. A groove 14 is also formed on the bottom of the recessed portion 11 as shown in FIGS. 1 and 2. The groove 14 extends in the radial direction of the upper arm 1 to the inner circumferential wall 16a.

As further illustrated in FIG. 3, the cam 32 possesses an axially extending boss portion 32e positioned around the connecting shaft 4 and extending toward the upper arm 1. A groove 32c shown in FIG. 2 is formed in the boss portion 32e and extends in the radial direction on the boss portion 32e.

A spiral spring 5 is arranged between the cam 32 and the upper arm 1. The inner end of the spiral spring 5 is fixed at the groove 32c and the outer end of the spiral spring 5 is fixed to the groove 14 such that the spiral spring 5 applies a biasing force or rotation force to the cam 32 in the counter-clockwise direction indicated by the arrow D in FIG. 3.

FIG. 4 shows two conditions of the cam 32 relative to the pawl 33. One condition is shown in solid line and represents the engagement condition of the cam 32 and the pawl 33. The other condition is shown is shown in the two-dotted line and represents the disengagement condition of the cam 32 and the pawl 33. A convex surface or projecting surface portion 331c and a concave surface or recessed surface portion 332c are formed on the pawl-cam surface 33c of each pawl 33. In addition, a first convex surface or first projecting surface portion 321d and a second convex surface or second projecting surface portion 322d are formed on the cam surface 32d of each protuberance 32b.

When the external gear 33a of each pawl 33 engages the internal gear 25a of the upper arm 2, the convex surface 331c of the pawl 33 contacts the first convex surface 321d of the cam 32. The first convex surface 321d is formed as an inclined surface along the rotational direction of the cam 32 such that the pressing force to the cam 33 increases in proportion to the counter-clockwise rotation of the cam 32 in FIG. 4. When the external gear 33a and the internal gear 25a are engaged, each of the pawls 33 is pressed by the cam 32 which is permitted to move in the perpendicular direction of the connecting shaft 4 axis so as to assert an equal pushing force on each of the pawls. As a result, firm engagement of all of the pawls with the internal gear 25a is achieved.

On the other hand, when the operational handle connected to the shaft 4 is operated to rotate the cam 32 in the clock-wise direction in FIG. 4, the cam 32 produces an aperture or space between the convex surface 331c and the first convex surface 321d. At that time, the pin 32f moves within the cam hole 33b so as to contact the inside wall of the cam hole 33b and all three pawls 33 are moved toward the axial line or axis C.

The spiral spring 5 applies a pushing force to the cam 32 in the direction perpendicular to the axial line or axis C, although the magnitude of the force is very small compared with the rotation force for the cam 32. The pushing force might tend to bias the rotation center of the cam 32 from the axial line or axis C to one or some of the pawls and cause the three pawls not to be disengaged simultaneously. To avoid this non-synchronized disengagement of the external gears 33a from the internal gear 25a, each of the second convex surfaces or second projecting surface portions 322d is arranged to contact one of the guide surface portions 12b of the projections 12, whereby the rotational center position of the cam 32 is guided and controlled substantially to match with the axial line or axis C. Thus, even though the connecting shaft 4 is not tightly inserted into the center bore 32a of the cam 32, the cam 32 forced to move on the axial line or axis C can release the three pawls 33 from the internal gear 25a simultaneously.

Although the projections 12 for sliding the pawls 33 are formed on the lower arm 1 in this embodiment, it is also possible to form the projections 12 on the upper arm 2. In this configuration, with respect to the lower arm 1, the spiral spring 5, the cam 32, the pawls 33 and the upper arm 2, the displacements of the parts are opposite to those in FIG. 3.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat reclining device for a vehicle comprising:
   a lower arm;
   an upper arm rotatably supported by the lower arm;
   an internal gear formed on one of the lower arm and the upper arm;
   a locking mechanism having a plurality of pawls each provided with an external gear to engage with or be disengaged from the internal gear;
   a cam rotatable to slidably move the pawls;
   a shaft engaging the cam; and
   a guide portion formed on one of the lower or upper arms wherein the guide portion guides the cam to match a rotation center of the cam with a center of the lower and upper arms only upon disengagement of the external gear on each pawl from the internal gear.

2. The seat reclining device for a vehicle according to claim 1, wherein the guide portion includes a pair of spaced apart projections, one of the pawls being slidably positioned between the projections.

3. The seat reclining device for a vehicle according to claim 1, wherein the cam is movable relative to the shaft in a direction perpendicular to a rotational axis of the shaft.

4. The seat reclining device for a vehicle according to claim 1, wherein each pawl includes an elongated through hole in which is positioned a pin extending from the cam.

5. The seat reclining device for a vehicle according to claim 1, wherein the cam includes a plurality of protuberances each provided with spaced apart first and second projecting surface portions, each of the second projecting surface portions engaging the guide portion.

6. The seat reclining device for a vehicle according to claim 1, wherein the guide portion is comprised of a plurality of spaced apart guide surface portions.

7. A seat reclining device for a vehicle comprising:
   a lower arm;
   an upper arm rotatably supported by the lower arm;
   an internal gear formed on one of the lower arm and the upper arm;
   a locking mechanism having a plurality of pawls each provided with an external gear to engage with or be disengaged from the internal gear;
   a cam rotatable to slidably move the pawls, the cam including a plurality of first projecting portions and a plurality of second projecting portions, the first projecting portions each engaging one of the pawls during rotation of the cam in a first direction to engage the external gear of the pawls with the internal gear;
   a shaft engaging the cam to transmit a rotation force to the cam to rotate the cam in a second direction opposite the first direction to permit disengagement of the external gear of the pawls from the internal gear; and
   a guide portion formed on one of the lower or upper arms, the guide portion being out of engagement with the second projecting portions when the external teeth are engaged with the internal teeth in a manner preventing relative rotation between the upper and lower arms and being engaged by one of second projecting portions during rotation of the cam in the second direction so that a rotation center of the cam coincides with a center of the lower and upper arms.

8. The seat reclining device for a vehicle according to claim 7, wherein the guide portion includes a pair of spaced apart projections, one of the pawls being slidably positioned between the projections.

9. The seat reclining device for a vehicle according to claim 7, including a plurality of spaced apart guide portions each engaged by one of the second projecting portions of the cam during rotation of the cam in the second direction.

10. The seat reclining device for a vehicle according to claim 7, wherein the cam is movable relative to the shaft in a direction perpendicular to a rotational axis of the shaft.

11. The seat reclining device for a vehicle according to claim 7, wherein the cam includes a plurality of protuberances, one of the first projecting portions and one of the second projecting portions being provided on each of the protuberances.

12. A seat reclining device for a vehicle comprising:

a lower arm;

an upper arm rotatably supported by the lower arm;

an internal gear formed on one of the lower arm and the upper arm;

a locking mechanism having a plurality of pawls each provided with an external gear to engage with or be disengaged from the internal gear;

a cam rotatable to slidably move the pawls during rotation of the cam in a first direction to engage the external gear of the pawls with the internal gear, with engagement between the external gear of the pawls and the internal gear causing the upper and lower arms to be rotationally fixed relative to one another;

a shaft engaging the cam to transmit a rotation force to the cam to cause the cam to rotate in a second direction opposite the first direction to permit disengagement of the external gear of the pawls with the internal gear; and a plurality of guide portions formed on one of the lower or upper arms, each guide portion including a pair of spaced apart projections between which is slidably arranged one of the pawls, at least one of the projections of each pair of projections having a guide surface portion which is out of engagement with the cam when the upper and lower arms are rotationally fixed relative to one another and which is engaged by the cam during rotation of the cam in the second direction.

13. The seat reclining device for a vehicle according to claim 12, wherein the guide surface portions are arranged along a circular arc having a center coinciding with a rotation axis of the shaft.

14. The seat reclining device for a vehicle according to claim 12, wherein the cam is movable relative to the shaft in a direction perpendicular to a rotational axis of the shaft.

15. The seat reclining device for a vehicle according to claim 12, wherein the cam includes a plurality of protuberances, each protuberance including a first projecting portion and a second projecting portion.

16. The seat reclining device for a vehicle according to claim 12, wherein the cam includes a plurality of first projecting portions and a plurality of second projecting portions, the first projecting portions each engaging one of the pawls during rotation of the cam in the first direction to engage the external gear of the pawls with the internal gear.

17. The seat reclining device for a vehicle according to claim 16, wherein each of the second projecting portions engages one of the guiding surface portions.

* * * * *